United States Patent [19]

Basson et al.

[11] Patent Number: 4,882,842

[45] Date of Patent: Nov. 28, 1989

[54] METHOD OF SIMPLIFYING ON-LINE ASSEMBLY OF VEHICULAR DOOR COMPONENTS

[75] Inventors: Rochford R. Basson, Ann Arbor; David V. Tinder, Dearborn; George A. Wooldridge, Warren, all of Mich.

[73] Assignee: United Technologies Automotive, Inc, Dearborn, Mich.

[21] Appl. No.: 97,555

[22] Filed: Sep. 15, 1987

[51] Int. Cl.[4] .............................................. H01R 43/00
[52] U.S. Cl. ...................................... 29/857; 264/255; 296/146
[58] Field of Search ............... 29/857; 439/34; 49/502; 264/255, 259, 267, 510; 296/39 R, 146, 152; 174/72 A

[56] References Cited

U.S. PATENT DOCUMENTS

| | | | |
|---|---|---|---|
| 2,566,871 | 9/1951 | Bedford et al. | 296/44 |
| 2,650,857 | 9/1953 | Watter et al. | 296/44 |
| 2,707,320 | 5/1955 | Fish | 29/152 |
| 2,791,464 | 5/1957 | Renno | 296/44 |
| 2,797,127 | 6/1957 | Renno | 296/44 |
| 2,797,128 | 6/1957 | Renno | 296/44 |
| 2,797,129 | 6/1957 | Renno | 296/44 |

(List continued on next page.)

FOREIGN PATENT DOCUMENTS

| | | | |
|---|---|---|---|
| 170150 | 2/1986 | European Pat. Off. | 296/146 |
| 3402135 | 7/1985 | Fed. Rep. of Germany | 296/146 |
| 3530413 | 2/1987 | Fed. Rep. of Germany | 439/34 |
| 2416809 | 10/1979 | France | 296/146 |
| 84621 | 5/1984 | Japan | 296/146 |
| 151125 | 8/1985 | Japan | 296/146 |
| 1372752 | 11/1974 | United Kingdom | 296/146 |
| 2117329 | 10/1983 | United Kingdom | 296/146 |
| 2149726 | 6/1984 | United Kingdom | 296/146 |
| 2164609 | 3/1986 | United Kingdom | 439/34 |
| 8505599 | 12/1985 | World Int. Prop. O. | 296/146 |

OTHER PUBLICATIONS

Article entitled "Rockwell Gets Modular in Europe", Automotive News, Mar. 24, 1986, p. D18.

Article entitled "Window to the Modular World"; by Roger Rowand.
One-page advertisement of Delco Products, Div. of General Motors, Dayton, Ohio, 45401 (date unknown).
Article entitled "Magna Wants to Produce Vehicles Searches for Partner" by David Versical, Automotive News, Mar. 23, 1987, p. 2.
Article entitled "Magna Hopes Some of Parts Tops Whole", by Gary Lamphier, The Wall Street Journal, Jul. 10, 1987, p. 6.
Article entitled "Rockwell Adapts to Changing Market", Automotive News, Jul. 27, 1987, p. E26.
"The Fourth RIM Generation", ME, Jan. 1986.

Primary Examiner—Timothy V. Eley
Assistant Examiner—Frances Chin

[57] ABSTRACT

A modular trim panel unit for the manufacturing and assembling of doors for motor vehicles, with the preassembly of the interior trim panel for the door including one or more basic mechanical and/or electrical components, which unit is manufactured off the main automotive assembly line, with the preassembled modular trim panel unit to be brought to the main assembly line for final assembly of the door. The trim panel unit adds no significant structural reinforcement to that of the final door assembly and is made up of at least one molded layer and includes the drive and motor of the window lift mechanism, with the window and guide(s) therefor and a drive connection being mounted on the main door frame structure. The panel unit can also include parts, if not all, of the door latch mechanism and door lock motor, as well as the actuating mechanisms therefor, and an electronics module (e.g., a remote multiplexing unit), all of the door switches, and preferably most of the lateral extent of the electrical wiring for the various electrical door components, all completely mounted and interconnected. The innermost molded layer can include a series of cavities or support and positioning walls for holding the various mechanical and electrical components in place, including a covered "box" area into which uncovered circuit board(s) can be inserted, as well as straddling plateau areas for making screw connections for the components.

22 Claims, 6 Drawing Sheets

U.S. PATENT DOCUMENTS

| | | | |
|---|---|---|---|
| 2,797,130 | 6/1957 | Renno | 296/44 |
| 3,022,447 | 2/1962 | Henss | 317/99 |
| 3,042,137 | 7/1962 | Mathues et al. | 180/90 |
| 3,174,576 | 3/1965 | Woofter et al. | 180/90 |
| 3,258,877 | 7/1966 | Peras | 49/502 |
| 3,772,571 | 11/1973 | Merry et al. | 317/99 |
| 3,782,036 | 1/1974 | Clark | 49/502 |
| 3,791,693 | 2/1974 | Hellriegel et al. | 296/146 |
| 3,970,354 | 7/1976 | Hopkins et al. | 339/113 R |
| 4,006,959 | 2/1977 | Hopkins et al. | 339/113 R |
| 4,151,683 | 5/1979 | Narita et al. | 49/502 |
| 4,306,381 | 12/1981 | Presto | 49/502 |
| 4,328,642 | 5/1982 | Presto | 49/502 |
| 4,369,608 | 1/1983 | Miura et al. | 52/309.9 |
| 4,411,466 | 10/1983 | Koike | 296/188 |
| 4,471,251 | 9/1984 | Yamashita | 310/89 |
| 4,564,232 | 1/1986 | Fujimori et al. | 296/146 |
| 4,603,894 | 8/1986 | Osenkowski | 292/216 |
| 4,606,148 | 8/1986 | Gandini | 49/502 |
| 4,608,779 | 9/1986 | Maeda et al. | 49/374 |
| 4,610,620 | 9/1986 | Gray | 425/434 |
| 4,648,208 | 3/1987 | Baldamus | 49/502 |
| 4,651,470 | 3/1987 | Imura et al. | 49/502 |
| 4,662,115 | 5/1987 | Ohya et al. | 49/502 |
| 4,711,052 | 12/1987 | Maeda et al. | 49/502 |

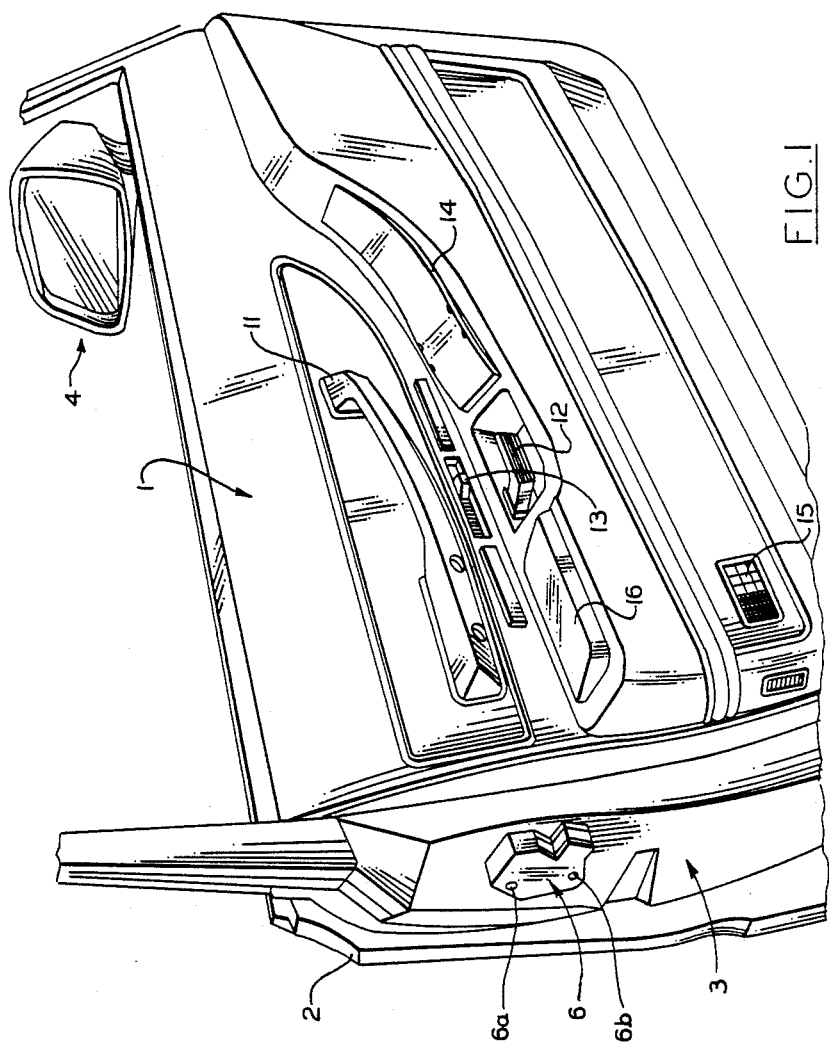

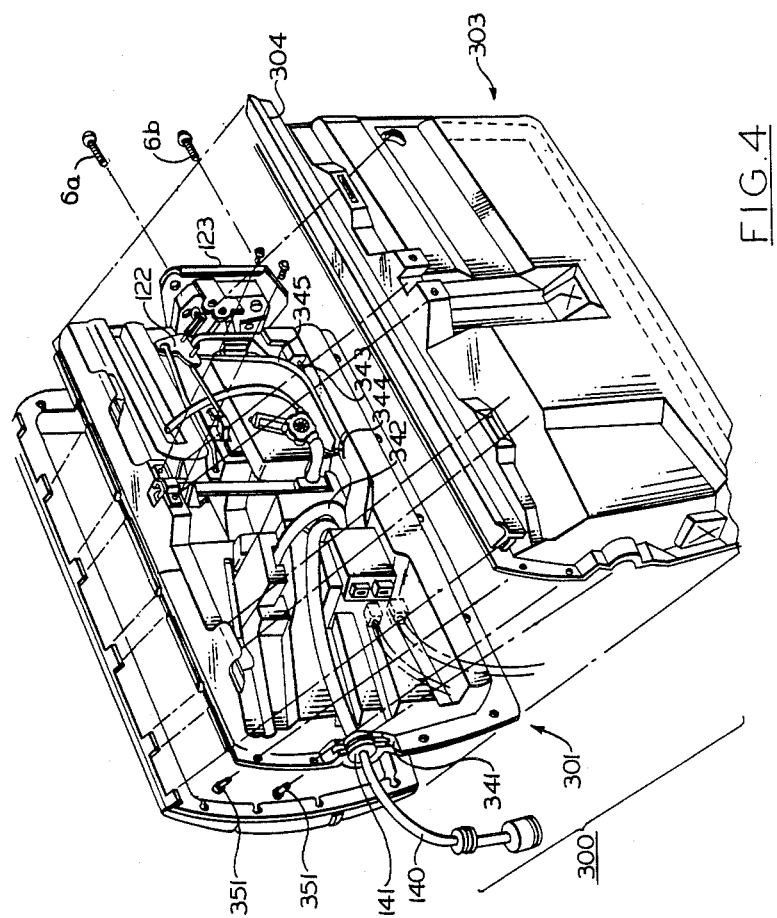

METHOD OF SIMPLIFYING ON-LINE ASSEMBLY OF VEHICULAR DOOR COMPONENTS

TECHNICAL FIELD

The present invention relates to the manufacturing and assembling of doors for motor vehicles and more particularly to a modular approach for making a substantial portion of the vehicular door off the main assembly line. Even more particularly, the present invention relates to the preassembly of the interior trim panel for the door with one or more basic mechanical and/or electrical components of the door included in the trim panel, which is manufactured off the main automotive assembly line, with the preassembled modular trim panel to be brought to the main assembly line for final assembly of the door on line.

BACKGROUND ART

It is common practice in the automotive industry to assemble the door components of a motor vehicle in an assembly line operation, which can often cause problems due to the relative complexity of the door assembly and its various components. For example, in assembling the door, the door is typically made up of two basic metal structural panels, to which is ultimately attached an interior, finished, trim panel, within which layered panel structure a number of mechanical and electrical components must be assembled. These include the window lift mechanism, the door latch and lock mechanism, the various electronic components, wiring and switches, etc., especially where the mechanical components are to be powered components, and also possibly including a door mirror assembly with its mechanical and electrical interfacing components.

Making this relatively complex assembly as the motor vehicle moves down the assembly line causes time and procedural problems with respect to the assembling and finishing of the rest of the motor vehicle.

Some attempts have been made in the past to try to alleviate this assembly line problem. For example, a door unit for motor vehicles has been disclosed in U.S. Pat. No. 4,648,208 (issued March 10, 1987 to Baldamus et al). The unit includes a unit carrier which has a number of the door's mechanical components mounted within it, which unit carrier can be attached to the interior trim panel in a preassembly operation. In particular, the complete window lift assembly (with or without the window) can be included in the unit carrier, along with possibly others of the door's mechanical components.

However, the Baldamus approach requires the inclusion of tubular reinforcing members, typically two vertically spaced ones running the width of the door, or a reinforced plate or other form of structural reinforcement. Thus, the Baldamus "trim panel" is actually turned into a structural support and reinforcement panel, changing the function of the panel from primarily a decorative trim panel with relatively no structural import to one of primary structural import.

The present invention considers it more desirable preferably to retain the initial assembling of all of the primary structural support or framing members on the main assembly line in the assembly plant, and preassembling the trim panel with its selected modular units, i.e. selected mechanical and electrical components, resulting in a trim panel which has relatively little structural, reinforcement capabilities, retaining its primary panel function as one of aesthetic trim and not of structural import.

The remainder of the door, particularly the door frame and the crash bar(s), typically made of metal or other structural strong material, is assembled on line at the assembly plant. These parts are designed to be able to take, for example, thousands of pounds of crash loads.

Another problem which exists in the prior art, including the Baldamus device, is the need for structural support and positioning of the various components, which are to be mounted on the trim panel, whether it also is converted into a structural strengthening reinforcement member, like in Baldamus, or not. One patent (U.S. Pat. No. 4,471,251 issued Sept. 11, 1984 to Yamashita) went to the extreme of suggesting that a motor mount structure for, for example, the window lift drive motor, would include a pair of casing halves, one of the casing halves being an integral part of two separate panels for the automotive door structure, including the basic door frame member. However, this creates serious problems of alignment and interfacing, among other things.

Other serious problems also exist in the prior art with respect to on-line assembly of vehicle doors and in providing modular door assemblies.

DISCLOSURE OF THE INVENTION

Thus, the present invention contemplates the preassembling of the trim panel, which is preferably molded, with one or more of the basic mechanical components of the door, and preferably with most if not all of the electronic components and preferably most of the electrical wiring, at least with respect to the wiring's lateral extent, which preassembled modular trim panel is thereafter brought to the main assembly line for being attached to the door structural framework.

The trim panel unit of this aspect of the invention does not add any structural integrity or crash protection of substance to the completed assembly and is not reinforced to, for example, accept frontal or side crash loads, the basic structural frame work of the door elements assembled on site providing these functions. The trim panel unit is able to only absorb various loads which occur during use, for example, the pull load on the door strap when the door is pulled closed, the user's leaning on the arm rest on the trim panel, the pulling of the door latch, window vertical "break-in" loads, etc.

These typically are substantially less than two hundred pounds. This is in contrast to the thousands of pounds of load the door itself is designed to absorb or withstand for certain periods of time during, for example, a frontal or side crash, typically measured in the thousands of pounds, for example, two thousand, two hundred and fifty pounds. Even in the relatively small loads for the trim panel unit mentioned, the panel is typically designed to transmit a good part of these small loads to the door framing members after the door is completely assembled.

The trim panel can be made in a one or two or more layered, molded panel unit, onto which is mounted, for example, the window lift mechanism and drive, the window lift motor, parts if not all of the door latch mechanism and door lock motor, as well as the actuating mechanisms therefor, and an electronics module (e.g., a remote multiplexing unit), all of the door switches, and preferably most of the lateral extent of the electrical wiring for the various electrical door components.

Ideally, the trim panel layer(s) are made in a reaction injection molding (RIM) process. In the molding process, supporting walls or cavities can be formed, if desired, on the inner side of the trim panel, into which the various components can be located, although the inner side alternatively can be made relatively smooth, if desired and the components hung off the inner side panel. A third plastic layer can be added for water protection.

Thus, the interior trim, wiring, electric actuators or switches, electronic module(s) and some mechanical mechanisms and linkages are assembled into or on the trim panel door module off line, either in a subsidiary assembly line or off-site in a separate assembly or manufacturing plant. The modular trim panels are thereafter brought to the main assembly line, when and as needed, for final assembly to the structural, frame door panel(s).

Regardless of whether or not the trim panel is also used for significant structural reinforcement, the hidden side of the trim panel can be configured, if desired, in accordance with another aspect of the invention to:

(a) locate and support actuators and switch arrays;
(b) provide one or more channel tracks to carry individual wires or wire bundles or other wire electrical conductive lines between the connectors and electrical devices;
(c) locate and support electronic module(s) or even unhoused printed circuit boards (for insertion into, for example, an open "box" molded into the panel); and
(d) support and guide mechanical links and mechanisms.

Thus, the trim panel module can carry most of the electrical content of the door, so that, for example, testing of the complete module before shipping can be done off-line, avoiding trouble "downstream" on the main assembly line.

Also, although with respect to some aspects of the present invention it is possible to mount the complete window structure on the trim panel, in accordance with another aspect of the invention, it is desirable to only include part of the window system on the trim panel, particularly the drive motor (if powered) and the drive mechanism. The window itself and its guide(s) and a drive connector are mounted in the main door frame structure at the assembly line or in another preassembly modular operation, with the two window subsystems to be interconnected in the main assembly operation.

Additionally, by using reaction injection molding (RIM) with a thermoset plastic (e.g., polyurethane) for the panel substrate, the molding pressure and temperature permit trimming of the panel in the mold, resulting in significant cost reduction. Also, the molding method permits large variations in wall thicknesses, implementing the configuring of the hidden side, as mentioned above.

Thus, a very basic purpose of one aspect of the present invention is to provide a modular trim panel unit for an automotive door assembly with total or near total electro-mechanical features, thereby minimizing as much manufacturing main assembly line effort as possible to produce a finished package for an automotive installation. From the perspective of a vendor-supplier the trim panel unit will be constructed to reduce any off-line door assembly time and diagnostics within the auto assembly plant operation.

Once several alignment and fastening features are determined, individual assembly of motors, linkages, and electronic packages and switches could be eliminated on-line.

Some responsibilities and methods proposed would include in one or more aspects of the present invention the following:

1. Window lift motor sub-assemblies could snap-engage with or spear into mechanical lift linkage hardware or drive connectors that would self-align to mating drive connectors or brackets fastened to the door glass mounted in outer steel fabricated door skins or frames. The window lift motors, which can be easily interconnected, include, for example, several types of drive devices for a customers preferred hardware, whether it be stamped flat gear, flexible plastic gear racks, or coiled spiral drive springs. In any case lubricants and/or sound abatement flocks or bating can be employed to minimize effects of vibration. Use of foams, and/or potting compounds may also be effective.

2. Universal bell crank pin engagements to outer door latch mechanisms from electric door lock actuators will furnish multi-directional movement or gimbled motors to fit a variety of positions. Some recent mechanical latch systems integrate well to produce electrical signals displaying audible, visual, or combined alarms triggered by door ajar switches.

3. An interior door lamp could incorporate a visual red alert flasher for passing vehicles, when a door is ajar, and flood lighting to view the ground and floor interior upon exiting or entering vehicle. Further investigation suggests that flashing intensifies "alert" condition and is readily accomplished through a multiplexed system. If conventional power is used, an inexpensive hazard flasher or turn signal device is recommended.

4. Manual door locking systems may be physically linked to override lock and unlock operation of the keyless entry module, harnessed with, for example, eight wires to the electronics module serviced with one connector. Electric four-way mirrors with "memory-set" also require, for example, seven wires via one connector to supply power from the electronic module to the side mirrors.

5. The seat switch with the window lift and mirror controls contain "remux" components that can be harnessed directly to the electronic module, with signal power supplied by, for example, four wires without a connector.

6. The door lock motor, window lift motor and interior lamp(s) can be directly harnessed without connectors by, for example, two wires each to the electronic module. A six wire harness can be routed from the module through the door pillar into the car junction area to synchronize the various door related functions with the overall system. The switch or electric control panel mounted on the door trim panel can exhibit separate 4-way mirror control, if desired. The combined switch elements into a single control panel lend themselves to a total multiplexing control system. In the event certain aspects of manufacturing do not permit use of full multiplexing conversion, then a hybrid approach could utilize conventional switch control, until vehicle designs are updated.

Some of the benefits of the modular trim panel unit of the present invention are:

1. Greater opportunity for styled, contoured, human-factored switches.

2. Minimized inventory and part numbers.
3. Better switch-to-trim fit and appearance.
4. Pre-tested subassembly.
5. Lower installation cost and time.
6. Lends itself more to robotic assembly.
7. Reduced assembly mistakes.

These and other objects, features and advantages of the present invention will become more apparent in light of the following detailed description of best mode exemplary embodiment(s) thereof, as illustrated in the accompanying drawings.

BRIEF DESCRIPTION OF THE DRAWINGS

FIG. 1 is a perspective, interior view of a fully assembled automotive door, showing the modular interior trim panel of the present invention assembled on the basic structural, framing members of the door, including the door frame and the exterior skin panel.

FIG. 2B showing a part of the trim panel and a complete view of the inner side of the basic door framework, with the door window in place awaiting its interfacing with the window lift mechanism in the trim panel; with the inner side (i.e. the side facing the other door elements) of the trim panel being relatively smooth or flat.

FIG. 4 is a view similar to FIG. 3A, but with a further embodiment of the modular trim panel of the present invention, which further embodiment is similar to that of FIGS. 3 & 3A, but which also includes the complete door latching mechanism for the door on the trim panel unit, among other things.

Figure 2A:
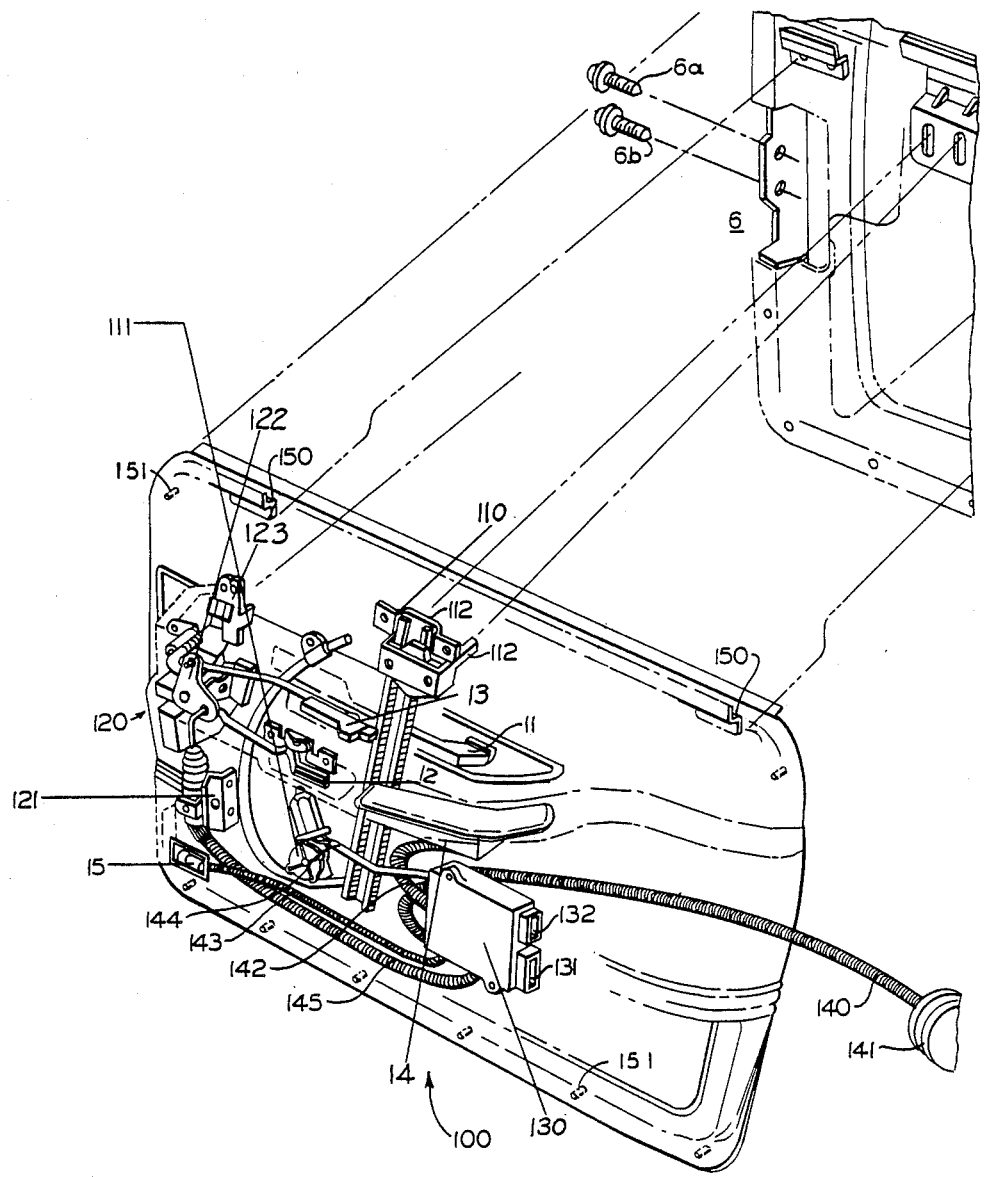
FIGS. 2A & 2B are perspective, exploded views showing a first, preferred, exemplary embodiment of the modular trim panel unit of the present invention and its interfacing with the basic structural support and framing members of the vehicle's door; with FIG. 2A showing the complete trim panel assembly with its interior mechanical and electrical components being viewable in "see through" fashion, along with a part of the basic door frame elements.

Best, Exemplary Modes For Carrying Out The Invention

As can be seen in FIG. 1, a typical door for a car includes an interior trim panel 1 mounted on and carried by the structural elements of the door, including the outer skin 2 and door frame 3. Typically, the basic structural members 2, 3 of the door are made of steel, although plastics are now coming into use for the door frame elements in some vehicles.

The trim panel 1 presents a finished, aesthetically pleasing surface and design and usually includes a door handle 11, and door latch actuator 12, a door lock actuator 13, an electrical control panel 14, an interior light 15 and an arm rest 16.

The control panel 14 can include, for example, the actuator buttons for power windows, power door locks, and seat positioning controls, etc. Additionally, typically a door mirror 4 is included on the exterior of the driver's door near the "A" pillar. The control panel 14 likewise can include controls for the mirror, including any heating of the mirror, as well as the left-and-right and up-and-down controls for itself, as well as for the right mirror mounted on the passenger door.

The door 1-3 will include within its structure various mechanical components, including a window lift mechanism, a door latching mechanism, a portion of which is mounted behind the door latch chamber 6 and is actuated by the latch arm 12, a door locking mechanism associated with the element 6 and actuated by the sliding lock arm 13, and possibly motor and heating mechanisms associated with the mirror 4. Additionally, the door 1-3 will include an electronic module, typically a remote multiplexing unit, for appropriately controlling the window lift drive, power door locks, mirror position and heating, and powered seats. Additional controls can be included if desired.

In the current practice in the automotive industry all of these door components are usually assembled in the assembly line of the assembly plant, as the motor vehicle moves down the line, at the cost of great time and relative complexity.

However, in the present invention, a number of the mechanical and/or electrical components are preassembled on the trim panel 1. For example, with reference to FIG. 2A, the molded trim panel 100 has mounted on it the moveable window lift mechanism 110, along with its window lift motor 111. These mechanisms are attached to and supported by the body of the trim panel 100 by screws or other suitable fasteners.

Likewise, at least a substantial part of the complete door latch actuating mechanism 120 and associated locking elements, including preferably many if not most, if not all, of their elements, is included as part of the trim panel 100. As illustrated, these can include the latch actuator arm or handle 12, the manual slide locking arm 13, the power door lock motor 121, the belt crank mechanism 122 and the complete door latch mechanism assembly 123 and all of their various mechanical interconnections, all assembled and attached together and mounted on the trim panel unit 100.

With respect to the electrical components, the switch control module 14 and the electronic module 130, which is typically a remote multiplexing unit (REMUX), the interior lamp 15, and all of their associated wire bundles are electrically interconnected, mounted on and carried by the molded trim panel 100. The electronic module 130 includes a connecting port 131 for receiving an electrical connector 131a leading to the "memory" mirror 4 for controlling and actuating its mechanical and electrical sub-components, along with a second port 132 for receiving an electrical connector 132a leading to the keyless entry element 5 (see FIG. 2B).

The wiring harness and bundles included within the door panel 100 include the incoming bundle 140, which is ultimately threaded through an opening 30 in the door frame 3 and sealed in the opening with a flexible sealing gasket 141. The electronic module connects the incoming wires from the bundle 140, as appropriate, to the other electrical door components through the control panel wiring bundle 142, the interior lamp wiring bundle 143, the window lift motor wiring bundle 144 and the powered door lock wiring bundle 145. Thus, the great bulk of the lateral travel of the electrical wires in the final completed door 1-3 occurs only in the trim panel unit 100, the only other significant lateral travel in the door occurring in the wire cable attached to the connector 132a going to the keyless entry unit 5.

However, even this limited lateral travel in the door elements 2-3 can be eliminated, if desired, by extending a wire bundle from the electronic module 130 up to an area adjacent to the door latch assembly 123 and terminating it with an appropriate connector there, for ultimate connection to the then closely positioned keyless unit 5. Likewise, with respect to vertical travel - the only additional exception being the wire cable attached to the connector 131b; and even this limited exception could be eliminated by eliminating port 131 and running a wire bundle in the panel unit 100 to an area adjacent to the right-most latch 150 in FIG. 2A and terminating it with an appropriate connector for the "memory" mirror electrical components.

All of the foregoing mechanical and electrical components and elements are attached to the trim panel 100 by means of appropriate fasteners, such as screws, snap fasteners, wire bundle loops or saddle staples, etc. Thus, they and the trim panel 1 stand together as a common, integrated unit 100.

However, due to the molded structure of the panel layer(s) for the trim panel 100 and the wall thickness(es) thereof, and the specific materials involved, the trim panel 100 has substantially no structural integrity enhancing strength with respect to the completed door 1-3, in comparison or with respect to the basic door frame elements 2, 3. The latter are designed to withstand high impact loads, including those created in frontal or side crashes, typically measurable in the thousands of pounds of force. Additionally, it is noted that, with respect to the window 7, the window channel or guide 8 and the drive connector 11 attached to the bottom of the window (see FIG. 2B), these elements are preferably not included in the module trim panel unit 100, but rather are included in the main assembly line with the door frame elements 2, 3.

Thus, the modular trim panel structure 100 need only have sufficient inherent structural strength to be self-supporting and allow it to be handled and to accept the relatively low or small actuation loads occurring during the use of the vehicle, which are created by, for example, the pulling of the door handle 11 to close the door or the actuation of the inside door handle 12 or the sliding, manual door lock 13 or the actuation of the various electrical switches in the control panel 14 or that produced by the occupant's use of the arm rest 16. However, in the preferred embodiments, the trim panel 100 is designed to transmit a large portion of even these low loads to the door frame elements 2, 3.

Thus, the combined structural strength of the entire assembly unit can be of insufficient structural strength to add significantly to the structural strength of the completed door.

After the trim panel unit 100 has had all of its mechanical and electrical components and elements added to it, it can be attached to a test stand and all of its assembly tested electrically and mechanically, greatly assuring that the fully assembled door 1-3 will not cause a problem in the assembly operation.

Figure 2B:
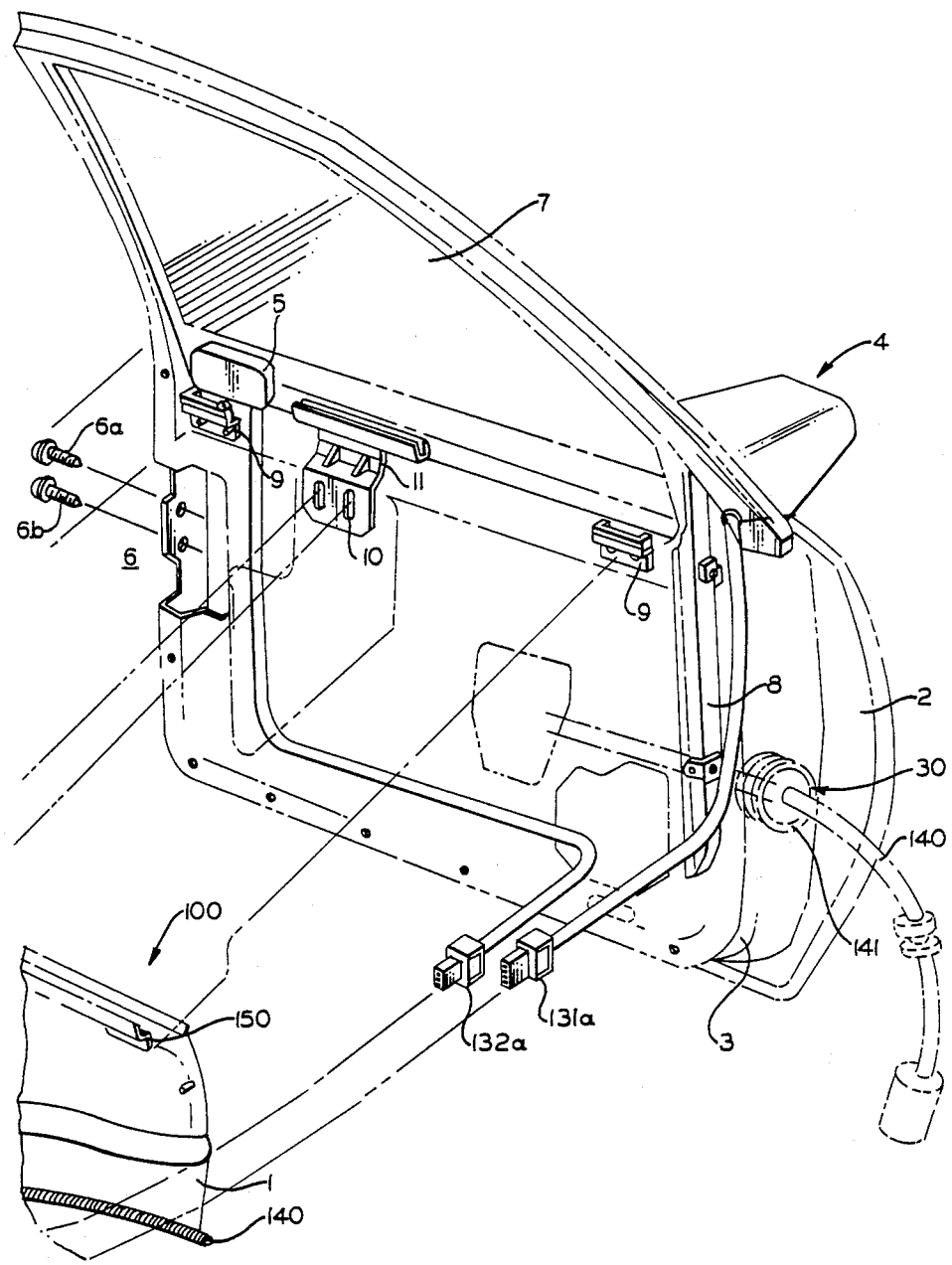

As can be seen in considering FIGS. 2A & 2B, the modular trim panel unit 100 can be added to the door frame elements 2, 3 and their associated structures on the assembly line simply by positioning the trim panel 100 in alignment with the door panel structure 2-3 and, using, for example, the hook/latch elements 150/9, initially latch them together. The modular trim panel unit 100 is then swung down and snap fastened to the door frame work 3, using the quick-connect snap fasteners 151 strategically placed about the interface between the trim panel 100 and the door frame elements 2, 3. Thus, in assembling the trim panel 1 (100) to the door frame work 2-3, a series of spaced snap fasteners 151, such as, for example, "Christmas trees", are used in the initial make up.

Additionally, a few screws or other screw-like fasteners are typically used to finish the complete door assemble. Thus, when the entire latching mechanism 123 is included on the panel unit 100, the attachment screws 6a, 6b are used to connect the frame end of the latching mechanism to the door frame structure 3.

In attaching the trim panel 100 to the door frame elements 2, 3, care of course should be taken to properly interface and couple the various mechanical components together, noting, for example, the window lift prongs 112, which are to be inserted into the slots 10 in the window drive coupling element 11 attached to the bottom of the window. Additionally, depending upon how much of the door latch mechanism and door lock mechanism is included on the trim panel 100, some mechanical interfacing is necessary at the door latch-/lock area 6 of the basic door frame members 2, 3.

Obviously, with the modular trim panel 100 having most of the door component elements preassembled on it, the actual online assembly of the completed door 1-3 is greatly simplified and quickened in the assembly line process.

Figure 3:
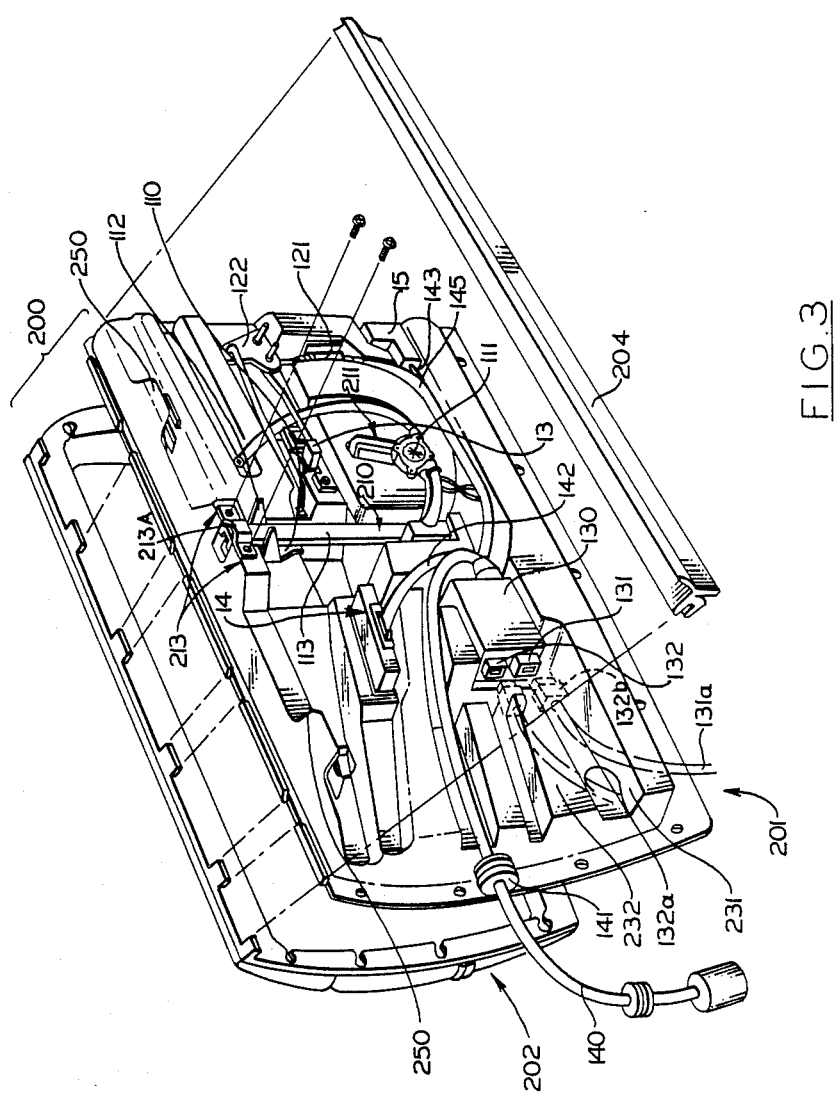
FIG. 3 is a perspective, exploded view of a second preferred, exemplary embodiment of the modular trim panel unit of the present invention being seen on its inner side and showing its two layer construction, with the second molded layer having support walls and cavities formed in it holding the various mechanical and electrical components included within and preassembled with the trim panel, but with only the bell crank part of the latching mechanism being included on the trim panel unit.
Figure 3A:
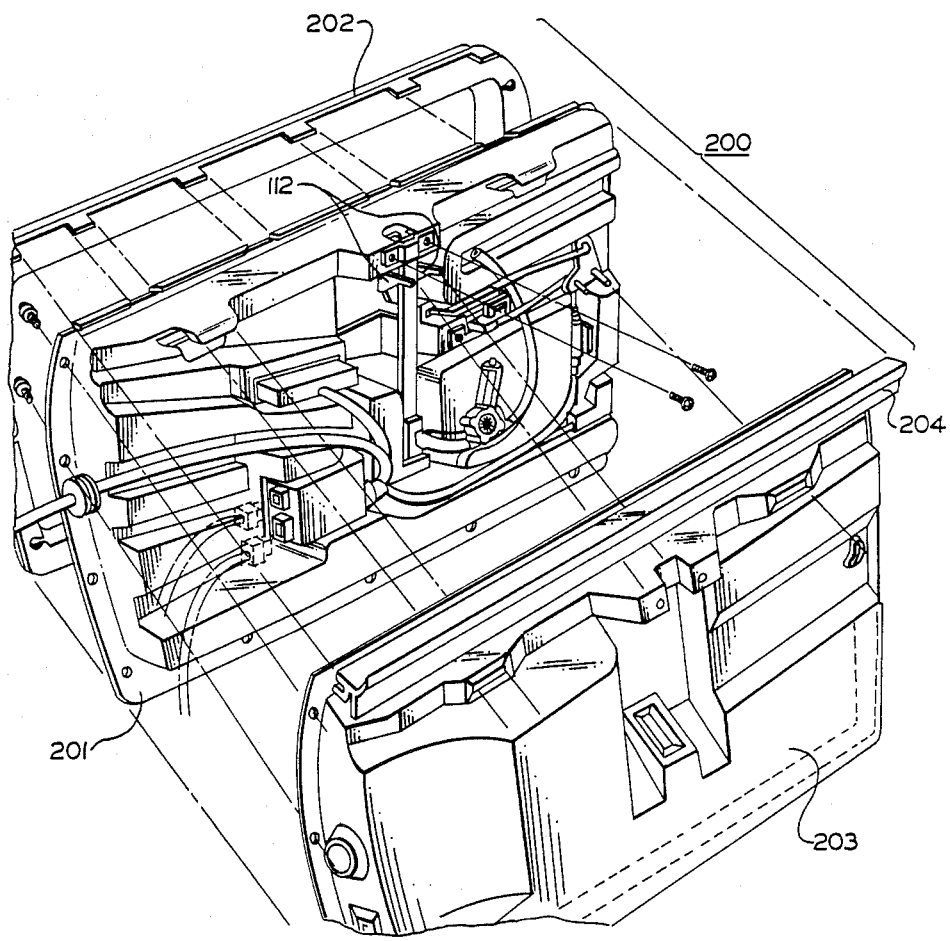
FIG. 3A is a view similar to FIG. 3, but also including in an exploded array a further plastic layer, typically vacuumed formed, providing a moisture barrier in use.

A second exemplary embodiment of the trim panel unit 200 is illustrated in FIGS. 3 & 3A. The primary difference between the two exemplary embodiments 100 & 200 is that the inner panel layer 201 has a series of molded cavities and support walls on its inner surface (i.e. the side to be faced into the basic door elements 2-3), rather than a relatively smooth or flat outer surface. These cavities and support walls are provided for supporting, positioning and holding the various mechanical and electrical components and elements.

Thus, for example, molded cavities 210 and 211 are provided for the window lift mechanism 110 and the window lift motor 111, respectively, holding and supporting them in their attached positions on the panel layer 201. Additionally, flanking plateau areas 213 are provided straddling the upper ends of the track 113 of the window lift mechanism 110, to which area screws with a strap 213A, as illustrated, are used to attach the track to the panel layer 201. Thus, as can be seen in FIG. 3, the upper part of the window lift regulator drive, including particularly the track 113, is mounted on the panel layer 201 in the laterally confined area between the two plateau areas 213 using the laterally elongated strap 213A to position and hold it in the laterally confined area. Also, for further example, side walls 231, 232 are provided to form channels for the connectors 131, 132, respectively, and their associated wire cables.

Other molded walls, channels, cavities and plateau areas for providing flanking fastening areas are also plainly seen in FIG. 3 for other ones of the mechanical and electrical components and elements. These molded protrusions on the panel layer 201 serve to assist, not only in the preassembly operation for the panel 200, but also to thereafter serve a supporting and holding function for the mechanical and electrical components and elements in the final door assembly 1-3.

As can be seen in FIG. 3A, a further moisture or vapor barrier layer 203 can be added, if desired. The barrier layer is quite thin and is typically formed by vacuum forming techniques on the layer 201. Slits, for example, to accommodate the vertical movement of the window lift drive prongs 112 can be easily made. However, all in all, the barrier layer serves to significantly protect the various mechanical and electrical components mounted on the panel unit 200 from water intrusion during use of the motor vehicle in, for example, inclement weather.

Additionally, if desired, a finished, window sealing gasket 204 can be provided along the top of the trim panel unit 200, as illustrated in FIGS. 3 & 3A. The rubber or plastic trim gasket or window molding 204 enhances the outward appearances of the trim panel 1 and serves as a wiping and sealing surface for the window 7, after the door 1-3 has been completely assembled.

Suitable fasteners (note, for example, those screw fasteners 351 shown in FIG. 4) are used to fasten separately molded panel layers 201, 202 together. Secondary barrier layer 203 is affixed to layer 201 during the assembly process. After its completed assembly and post-assembly testing, the trim panel unit 200 is then ready to be brought, when and as needed, to the main assembly line for attachment to the basic door frame structural elements 2-3, in similar fashion to that for trim panel unit 100.

A still further, exemplary embodiment for the trim panel unit 300 is illustrated in FIG. 4. The assembled trim panel unit 300 of FIG. 4 is basically the same as that of FIG. 3A, except that a complete latching mechanism 123 is provided on the panel unit, rather than just some of the elements; flat ribbon cabling 342-345 is used for the wire bundles 142-145; and an integral seating structure 341 is provided for the sealing gasket 141 on the molded panel layer 301; along with other interfacing details which are not pertinent to the present invention.

The trim panel unit 300, insofar as the present invention is concerned, is otherwise substantively identical to the trim panel unit 200. Accordingly, in the interest of brevity, further detailed discussion is considered unnecessary.

The various primary layers 1, 201/202 & 301/303 for the trim panel, but not the secondary moisture barrier covering, are preferably made by reaction injection molding, using typically a custom polyurethane system. In such RIM technology the finished trim material can be included in the mold for forming the outermost trim panel layer 1, 201, 301 in a single step. Using this process, the vinyl or fabric trim material is placed in the mold along with any appropriate cushioning foam, and the polyurethane resin is then poured or injected into the mold behind the trim.

The primary layers could be formed from a developmental family of high modulus, glass-flake reinforced polyurea-based reaction-injection molded (RIM) polymers, with high thermal stability and short production cycles of up to sixty seconds for large panels. These panels have been recommended for automotive fenders, hood, trunk, and door panels. The new prototype products have a nominal moduli ranging from 35,000 to 95,000 PSI and employ a new internal mold release technology to achieve the shortest cycles for large panels. Panels as large as fourteen lbs. demolded after only twenty or thirty seconds have sufficient green strength to eliminate post-curing or precision nesting fixtures. These products meet the automotive heat sag test of one hour at 325 degrees Fahrenheit and demonstrate no loss in properties after an hour at 375 degrees F. and are expected to meet demand for auto-productivity improvement standards and high temperature requirements for on-line painting that have limited reinforced injection molding (RIM) in the past. (For further reference note, for example, the January, 1986 ME Article on Dow Spectrim HT Prototype Products.)

The primary layers typically will have a wall thickness of from about sixty to eighty thousandths of an inch to about two hundred and fifty thousandths of an inch, with the ribs forming the component cavities and wall supports in the component layers 201 & 301 being up to about two inches high, with the secondary moisture or vapor shield layer being only about three to ten thousandths of an inch thick. The latter is typically vacuum formed from a thermoplastic, such as a polyester or a polypropelene. An alternate method of molding for the primary layer(s) is to use standard injection molding with a thermoplastic for the layers, with the finished trim material added thereafter.

It should be noted that in all of the exemplary embodiments of the invention described in detail above, the window, its guide(s) and a drive connector attached to the bottom of the window were included in the main structural door members and not on the modular trim panel. Although this approach is presently greatly preferred and part of one aspect of the present invention, it is also possible to mount all of the window components on the trim panel, if so desired.

Additionally, it should be noted that all of the foregoing embodiments produced a trim panel which added no substantial structural integrity to the over-all door structure. However, they of course do have enough structural strength or rigidity to be self-sustaining and to support and hold the various mechanical and electrical components mounted on it and to carry the relatively small loads which are generated during use, such as those that occur in the raising of the window or the actuation of the door latch or that which occurs in the user leaning on the arm rest or pulling on the door strap or handle to close it, etc., which are typically measured in a maximum range of about two hundred pounds or less. Even for these loads, a good part of them are merely transmitted to the door frame and associated structural elements. But it should be understood that, if so desired, reinforcement or structural framing members could be included with the modular trim panel unit and still be within one or more aspects of the present invention.

It should be further understood that the term "molded" as used in the context of this invention, includes not only injection molded plastic items, but also pressed material formed to take a particular shape, an example being pressed wood fibers with a binder, a technique which is currently used to make among other things the substrate for trim panels.

Thus, although this invention has been shown and described with respect to several exemplary, detailed embodiments thereof, it will be understood by those skilled in the art that various changes in form and detail thereof may be made without departing from the spirit and scope of the claimed invention.

Having thus described typical embodiments of the invention, that which is claimed as new and which is desired to be protected by Letters Patent is claimed below.

1. A method of simplifying an on-line assembly of door components of a motor vehicle to make a completely assembled door in a main assembly line at a main assembly site for the motor vehicle, comprising the following steps:

(a) manufacturing in a preassembly line operation a modular trim panel door assembly unit at at least one site removed from the main assembly line site for the motor vehicle, including the sub-steps of molding at least one panel layer having an innermost side and an outermost side, forming therein on the innermost side of said panel layer a series of cavities and walls;

providing on the outermost side of said panel layer a finished, trim layer; and mounting and attaching a number of electrical and mechanical elements for the door onto the molded panel layer within said molded cavities and adjacent to at least one of said walls, using said cavities and said walls to position and hold adjacent ones of said elements within said cavities and said walls; forming said modular trim panel door assembly unit; and (b) thereafter, forwarding said modular trim panel door assembly unit to a different site for the unit to be attached to a vehicular door frame including an exterior door panel of a motor vehicle to make a completely assembled door for the vehicle in the main assembly line.

2. The method of simplifying the on-line assembly of the door components of a motor vehicle of claim 1, wherein the door frame has mounted thereon a door window assembly and a drive coupling element attached therefor within the door frame on the main assembly line before the modular trim panel door unit is attached to it, and wherein, in step "a" in the sub-step of mounting and attaching, there is included the step(s) of:

mounting and attaching a window lift regulator drive and an actuating means therefor on said panel layer with a drive coupling element exposed to the innermost side of said molded panel layer for being coupled to the coupling element attached to said window assembly in an assembly of the completely assembled door on the main assembly line.

3. The method of simplifying the on-line assembly of the door components of a motor vehicle of claim 2, wherein said window drive forms an elongated structure and wherein, in step "a", in the molding sub-step, there is included the step of:

molding in two adjacent raised plateau areas on the innermost side of the molded panel forming a laterally confined area between them with an open top; and in the mounting and attaching sub-step, there is included the step of:

mounting one part of the window lift regulator drive in the laterally confined area and using a laterally elongated strap connected across the plateau areas to position and hold the mounted part of the window lift regulator in the laterally confined area.

4. The method of simplifying the on-line assembly of the door components of a motor vehicle of claim 1, wherein, in step "a", after the mounting and attaching sub-step, there is included the further sub-step of:

vacuum forming a vapor barrier covering over the innermost side of said first panel layer forming a barrier to water intrusion to said elements when the modular trim panel door assembly unit is in use in the vehicle door when the vehicle is exposed to water.

5. The method of simplifying the on-line assembly of the door components of a motor vehicle of claim 1, wherein, in the sub-step of molding, there is included the step of:

forming said panel layer by a reaction injection molding process with the finished trim layer being integrally formed with the panel layer during the reaction injection molding process.

6. The method of simplifying the on-line assembly of the door components of a motor vehicle of claim 1, wherein the completely assembled door is designed to absorb thousands of pounds of force, and wherein, in step "a", there is included the step of:

manufacturing the trim panel assembly unit for forwarding to the different site with a combined structural strength of the unit being of insufficient structural strength to add significantly to the structural strength of the completely assembled door.

7. The method of simplifying the on-line assembly of the door components of a motor vehicle of claim 1, wherein, in step "a", in the mounting and attaching sub-step, there is included the step of:

mounting a complete door latching mechanism onto the innermost side of the molded panel layer.

8. The method of simplifying the on-line assembly of the door components of a motor vehicle of claim 1, wherein, in step "a", in the molding sub-step, there is included the step of:

molding in two adjacent walls on the innermost side of the molded panel having an height of about two inches forming an extended channel between the walls having an open top; and in the mounting and attaching sub-step, there is included the step of:

mounting at least one set of longitudinally elongated electrical connectors in said channel and using the walls to position and hold the connectors in the channel.

9. A method of simplifying an on-line assembly of door components of a motor vehicle, which vehicle has an interior, to make a completely assembled door having a side facing the interior of the vehicle in a main assembly line at a main assembly line site for the motor vehicle, with the completely assembled door having a final trim finish on the interior side of the completely assembled door, comprising the following step(s):

(a) manufacturing in a preassembly line operation a modular trim panel door assembly unit at at least one site.

10. The method of simplifying the on-line assembly of the door components of a motor vehicle of claim 9, further comprising the following step(s):

vacuum forming a vapor barrier covering over the innermost side of said first panel layer forming a barrier to water intrusion to said elements when the trim panel unit is in use in the vehicle door when the vehicle is exposed to water.

11. The method of simplifying the on-line assembly of the door components of a motor vehicle of claim 9, wherein, in step "a", in the molding sub-step there is included the step of:

forming said second panel layer by reaction injection molding with the finished trim being integrally formed with the second panel layer during the reaction injection molding process.

12. The method of simplifying the on-line assembly of the door components of a motor vehicle of claim 9, wherein the door frame has mounted thereon a door window assembly and a drive coupling element attached therefor within the door frame on the main assembly line before the modular trim panel door unit is attached to it, and wherein, in step "a" in the sub-step of mounting and attaching, there is included the step(s) of:

mounting and attaching a window lift regulator drive and actuating means therefor onto the innermost side of the first molded panel layer with a drive coupling element exposed on the innermost side of the first molded panel layer for being coupled to the coupling element attached to said window assembly in an assembly of the completely assembled door on the main assembly line.

13. The method of simplifying the on-line assembly of the door components of a motor vehicle of claim 12, wherein said window drive forms an elongated structure and wherein, in step "a", in the first molding sub-step, there is included the step of:

molding in two adjacent raised plateau areas on the innermost side of the first molded panel layer forming a laterally confined area between them with an open top; and in the mounting and attaching sub-step, there is included the step of:

mounting one part of the window lift regulator drive in the laterally confined area and using a laterally elongated strap connected across the plateau areas to position and hold the mounted part of the window lift regulator in the laterally confined area.

14. The method of simplifying the on-line assembly of the door components of a motor vehicle of claim 9, wherein the completely assembled door is designed to absorb thousands of pounds of force, and wherein, in step "a", there is included the step of:

manufacturing the trim panel assembly unit for forwarding to the different site with a combined structural strength of the unit being of insufficient structural strength to add significantly to the structural strength of the completely assembled door.

15. The method of simplifying the on-line assembly of the door components of a motor vehicle of claim 9, wherein, in step "a", in the mounting and attaching sub-step, there is included the step of:

mounting a complete door latching mechanism onto the innermost side of the first molded panel layer.

16. The method of simplifying the on-line assembly of the door components of a motor vehicle of claim 9, wherein, in step "a", in the first molding sub-step, there is included the step of:

molding in two adjacent walls on the innermost side of the first molded panel layer having an height of about two inches forming an extended channel between the walls having an open top; and in the mounting and attaching sub-step, there is included the step of:

mounting at least one set of longitudinally elongated electrical connectors in the channel and using the walls to position and hold the connectors in the channel.

17. A method of simplifying an on-line assembly of door components of a motor vehicle to make a completely assembled door in a main assembly line for the motor vehicle, comprising the following steps:

(a) manufacturing in a preassembly line operation a modular trim panel door assembly unit at at least one site removed from the main assembly line for the motor vehicle, including the sub-steps of;

molding a trim panel layer having an innermost side and an outermost side, forming therein on the innermost side of said trim panel layer a series of attachment areas and providing on the outermost side of said trim panel layer a finished trim layer for the completely assembled door;

forming the molded trim layer by reaction injection molding with the finished trim layer being integrally formed with the molded panel layer during the reaction injection molding process;

mounting and attaching a number of operative elements for the door on said molded trim panel layer using said attachment areas; forming a modular trim panel door assembly unit; and (b) thereafter, forwarding said modular trim panel door assembly unit to a different site for the unit to be attached to a vehicular door frame including an exterior door panel of a motor vehicle at the main assembly line site to make a completely assembled door for the vehicle in the main assembly line.

18. The method of simplifying the on-line assembly of the door components of a motor vehicle of claim 17, wherein, in step "a", after the mounting and attaching sub-step, there is included the further sub-step of:

vacuum forming a vapor barrier covering over the innermost side of said panel layer forming a barrier to water intrusion to said elements when the modular trim panel door assembly unit is in use in the vehicle door when the vehicle is exposed to water.

19. The method of simplifying the on-line assembly of the door components of a motor vehicle of claim 17, wherein the completely assembled door is designed to absorb thousands of pounds of force, and wherein, in step "a", there is included the step of:

manufacturing the trim panel assembly unit for forwarding to the different site with a combined structural strength of the unit being of insufficient structural strength to add significantly to the structural strength of the completely assembled door.

20. A method of simplifying an on-line assembly of door components of a motor vehicle to make a completely assembled door in a main assembly line at a main assembly site for the motor vehicle, the completely assembled door being designed to absorb thousands of pounds of force, comprising the following steps:

(a) manufacturing in a preassembly line operation a modular trim panel door assembly unit at at least one site removed from the main assembly line site for the motor vehicle, including the sub-steps of;

molding at least one panel layer having an innermost side and an outermost side, forming therein on the innermost side of said panel layer a series of cavities and walls, including the molding in of two adjacent walls on the innermost side of the molded panel having an height of about two inches forming an extended channel between the walls having an open top;

providing on the outermost side of said panel layer a finished, trim layer; and mounting and attaching a number of electrical and mechanical elements for the door onto the molded panel layer within said molded cavities and adjacent to at least one of said walls, using said cavities and said walls to position and hold adjacent ones of said elements within said cavities and said walls, including mounting and attaching a window lift regulator drive and an actuating means therefor on the molded panel layer with a drive coupling element exposed to the innermost side of the molded panel layer for being coupled to a coupling element attached to a window assembly in an assembly of the completely assembled door on the main assembly line, and including mounting at least one set of longitudinally elongated electrical connectors in said channel and using the walls to position and hold the connectors in the channel;

forming the modular trim panel door assembly unit for forwarding to the main assembly site with a combined structural strength of the unit being of insufficient structural strength to add significantly to the structural strength of the completely assembled door; and (b) thereafter, forwarding said modular trim panel door assembly unit to the different site for the unit to be attached to a vehicular door frame including an exterior door panel of a motor vehicle to make a completely assembled door for the vehicle in the main assembly line, the door frame having mounted thereon a door window assembly and a drive coupling element attached therefor within the door frame on the main assembly line before the modular trim panel door unit is attached to it.

21. The method of simplifying the on-line assembly of the door components of a motor vehicle of claim 20, wherein said window drive forms an elongated structure and wherein, in step "a", in the molding sub-step, there is included the step of:

molding in two adjacent raised plateau areas on the innermost side of the molded panel forming a laterally confined area between them with an open top;

and in the mounting and attaching sub-step, there is included the step of:

mounting one part of the window lift regulator drive in the laterally confined area and using a laterally elongated strap connected across the plateau areas to position and hold the mounted part of the window lift regulator in the laterally confined area.

22. The method of simplifying the on-line assembly of the door components of a motor vehicle of claim 20, wherein, in step "a", in the mounting and attaching sub-step, there is included the step of:

mounting a complete door latching mechanism onto the innermost side of the molded panel layer.

* * * * *

UNITED STATES PATENT AND TRADEMARK OFFICE
CERTIFICATE OF CORRECTION

PATENT NO. : 4,882,842

DATED : November 28, 1989

INVENTOR(S) : Rochford R. Basson et al

Page 1 of 2

It is certified that error appears in the above-identified patent and that said Letters Patent is hereby corrected as shown below:

Col. 12, claim 9, line 54, after "site" delete "." and insert: -- removed from the main assembly line site for the motor vehicle, including the sub-steps of -
- molding a first panel layer having an innermost side and an outer side, forming therein on the innermost side of said first panel layer a series of attachment areas;
- separately molding a second panel layer having an exterior side;
- providing on the exterior side of said second panel layer a trim finish layer suitable for the final trim finish of the completely assembled door;
- attaching said first and second panel layers together; and
- mounting and attaching a number of operative elements for the completely assembled door on the first panel layer using said attachment areas;

forming a modular trim panel door assembly unit; and (b) thereafter, forwarding said modular trim panel door assembly unit to a different site for the unit to be attached to a vehicular door frame including an exterior door panel of a motor vehicle on the main assembly line site to make a completely assembled door for the vehicle on the main assembly line.--

Col. 15, claim 20, line 21, change "different" to --main assembly--.

UNITED STATES PATENT AND TRADEMARK OFFICE
CERTIFICATE OF CORRECTION

PATENT NO. : 4,882,842

DATED : November 28, 1989

INVENTOR(S) : Rochford R. Basson et al

It is certified that error appears in the above-identified patent and that said Letters Patent is hereby corrected as shown below:

Col. 15, claim 20, line 21, change "different" to --main assembly--.

Signed and Sealed this

Sixth Day of November, 1990

*Attest:*

HARRY F. MANBECK, JR.

*Attesting Officer*     *Commissioner of Patents and Trademarks*